(12) United States Patent (10) Patent No.: US 8,291,233 B2
Pearson et al. (45) Date of Patent: *Oct. 16, 2012

(54) METHOD AND SYSTEM FOR MAINTAINING LOGIN PREFERENCE INFORMATION OF USERS IN A NETWORK-BASED TRANSACTION FACILITY

(75) Inventors: Jennifer Pearson, San Jose, CA (US); Alex Dai-Shun Poon, Los Altos Hills, CA (US); Buffy Poon, Los Altos Hills, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,619

(22) Filed: Sep. 13, 2010

(65) Prior Publication Data

US 2011/0023098 A1    Jan. 27, 2011

Related U.S. Application Data

(63) Continuation of application No. 11/941,686, filed on Nov. 16, 2007, now Pat. No. 7,797,548, which is a continuation of application No. 09/772,347, filed on Jan. 29, 2001, now Pat. No. 7,310,733.

(51) Int. Cl.
*G06F 21/00* (2006.01)
*H04L 29/06* (2006.01)
(52) U.S. Cl. .......................................... 713/185; 726/8
(58) Field of Classification Search ........................ None
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |

(Continued)

FOREIGN PATENT DOCUMENTS

CA    2253543 A1    3/1997

(Continued)

OTHER PUBLICATIONS

"U.S. Appl. No. 09/772,347, Advisory Action mailed Aug. 7, 2006", 3 pgs.

(Continued)

*Primary Examiner* — Brandon Hoffman
(74) *Attorney, Agent, or Firm* — Schwegman Lundberg & Woessner, P.A.

(57) ABSTRACT

The present invention relates to various aspects for maintaining and utilizing login preference information of users of a network-based transaction facility. In one embodiment, user interface information is communicated to a client via a communications network. The user interface information includes information concerning a plurality of features within the network-based transaction facility. The user interface information also specifies a login interface that facilitates user input of login preference information pertaining to each of the plurality of features. Further, the login preference information is received from the client via the communications network and utilized to control user access to any of the plurality of features within the network-based transaction facility via the communications network.

20 Claims, 16 Drawing Sheets

U.S. PATENT DOCUMENTS

| | | | |
|---|---|---|---|
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,375,055 A | 12/1994 | Togher et al. | |
| 5,394,324 A | 2/1995 | Clearwater | |
| 5,426,281 A | 6/1995 | Abecassis | |
| 5,485,510 A | 1/1996 | Colbert | |
| 5,553,145 A | 9/1996 | Micali | |
| 5,557,728 A | 9/1996 | Garrett et al. | |
| 5,598,557 A | 1/1997 | Doner et al. | |
| 5,640,569 A | 6/1997 | Miller et al. | |
| 5,657,389 A | 8/1997 | Houvener | |
| 5,664,115 A | 9/1997 | Fraser | |
| 5,689,652 A | 11/1997 | Lupien et al. | |
| 5,694,546 A | 12/1997 | Reisman | |
| 5,706,457 A | 1/1998 | Dwyer et al. | |
| 5,710,889 A | 1/1998 | Clark et al. | |
| 5,715,314 A | 2/1998 | Payne et al. | |
| 5,715,402 A | 2/1998 | Popolo | |
| 5,717,989 A | 2/1998 | Tozzoli et al. | |
| 5,727,165 A | 3/1998 | Ordish et al. | |
| 5,771,291 A | 6/1998 | Newton et al. | |
| 5,771,380 A | 6/1998 | Tanaka et al. | |
| 5,790,790 A | 8/1998 | Smith et al. | |
| 5,794,219 A | 8/1998 | Brown | |
| 5,799,285 A | 8/1998 | Klingman | |
| 5,803,500 A | 9/1998 | Mossberg | |
| 5,818,914 A | 10/1998 | Fujisaki | |
| 5,826,244 A | 10/1998 | Huberman | |
| 5,835,896 A | 11/1998 | Fisher et al. | |
| 5,845,265 A | 12/1998 | Woolston | |
| 5,845,266 A | 12/1998 | Lupien et al. | |
| 5,850,442 A | 12/1998 | Muftic | |
| 5,872,848 A | 2/1999 | Romney et al. | |
| 5,873,069 A | 2/1999 | Reuhl et al. | |
| 5,884,056 A | 3/1999 | Steele | |
| 5,890,138 A | 3/1999 | Godin et al. | |
| 5,905,974 A | 5/1999 | Fraser et al. | |
| 5,905,975 A | 5/1999 | Ausubel | |
| 5,922,074 A | 7/1999 | Richard et al. | |
| 5,926,794 A | 7/1999 | Fethe | |
| 5,983,227 A * | 11/1999 | Nazem et al. | 1/1 |
| 5,991,739 A | 11/1999 | Cupps et al. | |
| 6,035,288 A | 3/2000 | Solomon | |
| 6,035,402 A | 3/2000 | Vaeth et al. | |
| 6,044,363 A | 3/2000 | Mori et al. | |
| 6,047,264 A | 4/2000 | Fisher et al. | |
| 6,055,518 A | 4/2000 | Franklin et al. | |
| 6,058,417 A | 5/2000 | Hess et al. | |
| 6,061,448 A | 5/2000 | Smith et al. | |
| 6,073,117 A | 6/2000 | Oyanagi et al. | |
| 6,085,176 A | 7/2000 | Woolston | |
| 6,104,815 A | 8/2000 | Alcorn et al. | |
| 6,119,137 A | 9/2000 | Smith et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,243,691 B1 | 6/2001 | Fisher et al. | |
| 6,266,651 B1 | 7/2001 | Woolston | |
| 7,188,305 B1 * | 3/2007 | Corbin et al. | 715/205 |
| 7,797,548 B2 | 9/2010 | Pearson et al. | |
| 2008/0072062 A1 | 3/2008 | Pearson et al. | |

FOREIGN PATENT DOCUMENTS

| | | | |
|---|---|---|---|
| FR | 2658635 A1 | 8/1991 | |
| NL | 9300266 | 2/1993 | |
| WO | WO-9215174 A1 | 9/1992 | |
| WO | WO-9634356 A1 | 10/1996 | |
| WO | WO-9737315 A1 | 10/1997 | |
| WO | WO-9963461 A1 | 12/1999 | |
| WO | WO-0112398 A1 | 2/2001 | |

OTHER PUBLICATIONS

"U.S. Appl. No. 09/772,347, Advisory Action mailed Aug. 31, 2005", 4 pgs.

"U.S. Appl. No. 09/772,347, Final Office Action mailed Jun. 14, 2005", 14 pgs.

"U.S. Appl. No. 09/772,347, Non Final Office Action mailed Apr. 9, 2010", 4 pgs.

"U.S. Appl. No. 09/772,347, Non Final Office Action mailed Oct. 24, 2006", 14 pgs.

"U.S. Appl. No. 09/772,347, Non Final Office Action mailed Nov. 3, 2004", 12 pgs.

"U.S. Appl. No. 09/772,347, Non Final Office Action mailed Nov. 22, 2005", 13 pgs.

"U.S. Appl. No. 09/772,347, Notice of Allowance mailed Aug. 2, 2007", 6 pgs.

"U.S. Appl. No. 09/772,347, Response filed Jan. 24, 2007 to Non Final Office Action mailed Oct. 24, 2006", 17 pgs.

"U.S. Appl. No. 09/772,347, Response filed Jan. 31, 2005 to Non Final Office Action mailed Nov. 3, 2004", 14 pgs.

"U.S. Appl. No. 09/772,347, Response filed Feb. 22, 2006 to Non Final Office Action mailed Nov. 22, 2005", 12 pgs.

"U.S. Appl. No. 09/772,347, Response filed Jul. 6, 2007 to Non Final Office Action mailed Apr. 9, 2007", 13 pgs.

"U.S. Appl. No. 09/772,347, Response filed Aug. 15, 2005 to Final Office Action mailed Jun. 14, 2005", 12 pgs.

"U.S. Appl. No. 09/772,347, Response filed Sep. 14, 2005 to Advisory Action mailed Aug. 31, 2005", 10 pgs.

"U.S. Appl. No. 11/941,686, Non-Final of Action mailed Oct. 20, 2009", 15 pgs.

"U.S. Appl. No. 11/941,686, Notice of Allowance mailed May 11, 2010", 7 pgs.

"U.S. Appl. No. 11/941,686, Response filed Jan. 20, 2010 to Non Final Office Action mailed Oct. 20, 2009", 10 pgs.

"Haggle Online Account Information and Maintenance", http://web.archive.org/web/19980629023443/www.haggle.com/account.html, Pulled from Wayback Machine—www.archive.org, (Jun. 29, 1998).

"My Yahoo Web Page", http://web.archive.org/web/19981212015816/h550://my.yahoo.com, "My Yahoo" page obtained from "Wayback Machine" on Oct. 14, 2004, (Dec. 12, 1998), 3 p.

"Onsale Joins Fray as Online Shopping Picks Up Speed: Internet Booms", Computer Reseller News, CMP Publications, Inc., USA, (Jun. 5, 1995), 1 pg.

"Onsale: Onsale Brings Thrill of Auctions and Bargain Hunting Online; Unique Internet retail service debuts with week-long charity auction for The Computer Museum in Boston", Business Wire, Dialog Web. 0489267 BW0022, (May 24, 1995), 3 pages.

"Yahoo Auctions", http://web.archive.org/web/19990208003424/http://auctions.yahoo.com/, (Feb. 8, 1999), 2 p.

Baumann, G. W, "Personal Optimized Decision/Transaction Program", IBM Technical Disclosure Bulletin,, (Jan. 1995), 83-84.

Business Wire, "Mediappraise Receives National Award for Web-based Technology That Enables Companies to Solve Thorny HR Problem", Business Wire, (Dec. 14, 1998), 1-2.

Clemons, E, "Evaluating the prospects for alternative electronic securities", Proceedings of ICIS 91: 12th International Conference on Information Systems, (Dec. 16-18, 1991), 53-61.

Graham, I, "The Emergence of Linked Fish Markets in Europe", Focus Theme, 1-4.

Hauser, R, "Anonymous Delivery of Goods in Electronic Commerce", IBM Technical Disclosure Bulletin, 39(3), (Mar. 1996), 363-366.

Hess, C M, et al., "Computerized Loan Organization System: An Industry Case Study of the Electronic Markets Hypothesis", MIS Quarterly, vol. 18(3), (Sep. 1994), 251-274.

Klein, Stefan, "Introduction to Electronic Auctions", Focus Theme, vol. 7, No. 4, (1997), 1-4.

Lee, H. G, "Electronic brokerage and electronic auction: the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

Malone, T., et al., "Electronic Markets and Electronic Hierarchies", Communications of the ACM, 14(25), (Jun. 1987), 484-497.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

Meade, J., "Visual 360: A Performance Appraisal System That's 'Fun'", HR Magazine, Society for Human Resource Management., (Jul. 1999), 3 pgs.

Neo, B S, "The implementation of an electronic market for pig trading in Singapore", Journal of Strategic Information Systems; vol. 1(5), (Dec. 1992), 278-288.

Post, D L, et al., "Application of auctions as a pricing mechanism for the interchange of electric power", IEEE Transactions on Power Systems, 10(3), (Aug. 1995), 1580-1584.

Preist, Chris, et al., "Adaptive Agents in a Persistent Shout Double Auction", International Conference on Information and Computation Economies, Proceedings of the first international conference on Information and computation economies, (1999), 11-18.

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rockoff, T E, et al., "Design of an Internet-based system for remote Dutch auctions", Internet Research: Electronic Networking Applications and Policy, vol. 5(4), (Jan. 1, 1995), 10-16.

Schmid, B F, "The Development of Electronic Commerce", EM—Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Tjostheim, Ingvar, et al., "A case study of an on-line auction for the World Wide Web", Norwegian Computing Center (NR)http://www.nr.no/~ingvar/enter98.html, 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, 6 pgs.

Warbelow, A, et al., "Aucnet: TV Auction Network System", Harvard Business School Case/Study, HBVR#9-190-001, USA, (Jul. 1989), 1-15.

Zwass, V., "Electronic Commerce: Structures and Issues", International Journal of Electronic Commerce, Fall 1996, vol. 1, No. 1, (Fall 1996), 3-23.

\* cited by examiner home | my page | site map | sign in

Browse | Sell | Services | Search | Help | Community

[Search] tips

☐ Search titles and descriptions

702

Bid confirmed for: test item, do not bid (item #109574)

Your bid was in the amount of:　　　　　　　US$0.01
Your maximum bid was in the amount of:　　US$0.01
After processing all the open bids for
this item, the current bid price is　　　　　US$0.01

Thank you for your bid! You are the current high bidder for this item! You will be notified if your maximum bid is exceeded by another bidder:

Please note that the listings on the index pages are not updated right away, but your bid has been recorded.

Important: please take not of the closing date of this auction. At midnight following the close, the seller and the high-bidder will be notified by e-mail, and you have only three business days to contact each other befor losing your position as high-bidder.

802

Note: Are you tired of typing in your User ID and Password over and over again? Try the new [Sign In] feature to save time.

| test item, do not bid (109574) |

Books, Movies, Music:Movies:Videos:General

| | Currently | US$0.01 | First bid | US$0.01 |
| Description | Quantity | 1 | # of bids | 1(bid history) (with emails) |
| | Time left | 6 days, 23 hours + | Location | San Jose |
| | Started | 08/03/99, 17:46:54PDT | ✉ (mail this auction to a friend) |
| | Ends | 08/10/99, 17:46:54PDT | 🎁 (request a gift alert) |
| Bid! | Seller | mark2 (25) |
| | | (view comments in seller's Feedback Profile) (view seller's other auctions) |
| | | (ask seller a question) |
| | High bid | jen (0) |
| | Payment | See item description for payment methods accepted |
| | Shipping | See item description for shipping charges |

Seller assu8mes all responsibility for listing this item. You should contact the seller to resolve any questions before bidding. Currency is U.S. dollar (US$) unless otherwise noted.

FIG. 7

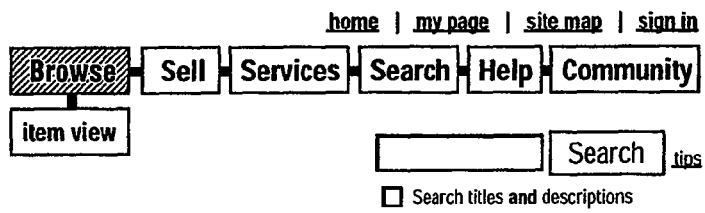

704

User ID History and Email Address Request Form

We kindly request that you submit your User ID and password to view the User ID History or email addresses of other users.

Note: When the shades icon appears next to a User ID, it signifies that the user has changed his/her User ID within the last 30 days. The shades icon will disappear after the user has maintained the same User ID for a 30-day period.

| Enter Your User ID and Password |
|---|
| User ID: [          ] |
| Password: [          ] |

[ Submit ]

902

Note: Are you tired of typing in your User ID and Password over and over again? Try the [ Sign In ] feature to save time.

FIG. 8

708 home | my page | site map | sign in

| Browse | Sell | Services | Search | Help | Community |

| overview | registration | buying & selling | my page | about me | feedback forum | safe harbor |

[          ] Search  tips
☐ Search titles and descriptions

Welcome, please sign in

Existing users, sign in to save time for bidding, selling, and other activities:

| User Member Sign In |
|---|
| User ID: [          ] — 1002 |
| Password: [          ] — 1004 |

Note: By sign in, you'll get a temporary "cookie" which will (1) remember your User ID for this browser session, (2) allow you to setup where you would also like your Password to be remembered for this browser session. If there is no activities in the next 20 minutes or when you close the browser, the cookie will expire. For more information about cookies, click here.
1006

[Sign In]

New User?

FIG. 9

710 home | my page | site map | sign in

| Browse | Sell | Services | Search | Help | Community |

| overview | registration | buying & selling | my page | about me | feedback forum | safe harbor |

[            ] Search  tips
☐ Search titles and descriptions

Welcome, user1

Set Sign In Preferences

You are currently signed in, check the boxes below to set up where you would like to have your password remembered during this browser session: (need more explanation)

1102 ☐ Selling         1108 ☐ Bidding
1104 ☐ Chat                 ☐ Feedback
1106 ☐ My Page      1110 ☐ Other Activities (such, for example, revise your item, request user email address)
                      1112

Set Display Preferences

☐ Display bidders/sellers email address information with their User ID

[Save]

1114 { Note: You may change your setting later via my preferences tab.

FIG. 10

720 home | my page | site map | sign in

| Browse | Sell | Services | Search | Help | Community |

[      ] Search tips
☐ Search titles and descriptions

Bid confirmed for: test item, do not bid (item #109574)

Your bid was in the amount of:              US$0.01
Your maximum bid was in the amount of:      US$0.01
After processing all the open bids for
this item, the current bid price is         US$0.01

Thank you for your bid! You are the current high bidder for this item! You will be notified if your maximum bid is exceeded by another bidder:

Please note that the listings on the index pages are not updated right away, but your bid has been recorded.

Important: please take not of the closing date of this auction. At midnight following the close, the seller and the high-bidder will be notified by e-mail, and you have only three business days to contact each other befor losing your position as high-bidder.

Note: You are currently signed in for this browser session. To change your sign in preferences, click here. Do not leave your computer un-attended without signing out.

⎣ 1502

| test item, do not bid (109574) |
|---|
| Books, Movies, Music:Movies:Videos:General |

| | Currently | US$0.01 | First bid | US$0.01 |
| | Quantity | 1 | # of bids | 1 (bid history) (with emails) |
| | Time left | 6 days, 23 hours + | Location | San Jose |
| Description | Started | 08/03/99, 17:46:54PDT | ✉ (mail this auction to a friend) |
| | Ends | 08/10/99, 17:46:54PDT | 🎁 (request a gift alert) |

Seller      mark2 (25)
            (view comments in seller's Feedback Profile) (view seller's other auctions)
            (ask seller a question)

High bid    jen(0)

Payment     See item description for payment methods accepted
Shipping    See item description for shipping charges Seller assu8mes all responsibility for listing this item. You should contact the seller to resolve any questions before bidding. Currency is U.S. dollar (US$) unless otherwise noted.

FIG. 14

METHOD AND SYSTEM FOR MAINTAINING LOGIN PREFERENCE INFORMATION OF USERS IN A NETWORK-BASED TRANSACTION FACILITY

PRIORITY APPLICATION

This application is a Continuation of U.S. application Ser. No. 11/941,686, filed on Nov. 16, 2007 and issued on Sep. 14, 2010 as U.S. Pat. No. 7,797,548, which is a Continuation of U.S. application Ser. No. 09/772,347, filed on Jan. 29, 2001 and issued on Dec. 18, 2007 as U.S. Pat. No. 7,310,733, which applications are incorporated herein by reference in their entirety.

FIELD OF THE INVENTION

The present invention relates generally to the field of access restriction and, more specifically, to the maintaining login preference information of users in a network-based transaction facility such as, for example, an Internet-based auction facility.

BACKGROUND OF THE INVENTION

A network-based transaction facility (e.g., a business-to-business, business-to-consumer and consumer-to-consumer Internet marketplace and retailer) may offer its users a variety of features. For instance, an Internet-based auction facility may provide such features as bidding, listing, feedback, chatting, etc. Typically, users of a network-based transaction facility must enter their user identifier (user id) and password every time they perform any significant activity within the transaction facility. For example, in an auction facility, a user is required to enter his or her user id and password each time the user wishes to access a bidding feature, a listing feature, a feedback feature, or any other feature provided by the auction facility. Requiring a user to enter his or her user id and password multiple times during the user session within a transaction facility causes inconvenience to the user and destructs the user's attention from the online activity being performed.

SUMMARY OF THE INVENTION

The present invention relates to various aspects for maintaining and utilizing login preference information of users of a network-based transaction facility. In one embodiment, user interface information is communicated to a client via a communications network. The user interface information includes information concerning a plurality of features within the network-based transaction facility. The user interface also specifies a login interface that facilitates user input of login preference information pertaining to each of the plurality of features. Further, the login preference information is received from the client via the communications network and utilized to control user access to any of the plurality of features within the network-based transaction facility via the communications network.

BRIEF DESCRIPTION OF THE DRAWINGS

The present invention is illustrated by way of example and not limitation in the figures of the accompanying drawings, in which like references indicate similar elements and in which:

FIGS. 7-15 are exemplary representations of various interfaces included in the sequence of interfaces shown in FIG. 6.

DETAILED DESCRIPTION

A method and system for maintaining and utilizing login preference information of users of a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
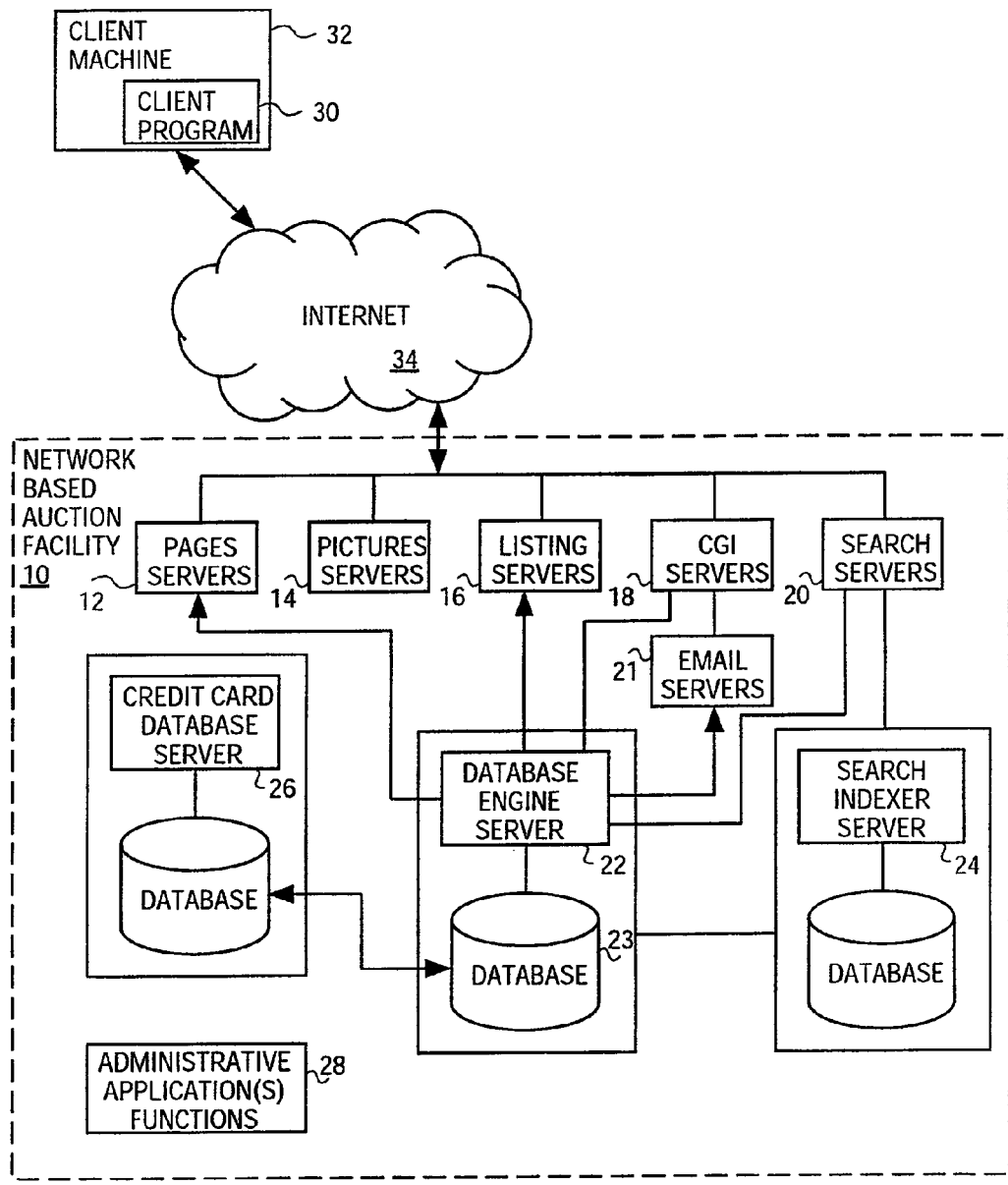
FIG. 1 is a block diagram of one embodiment of a network-based transaction facility.

FIG. 1 is block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
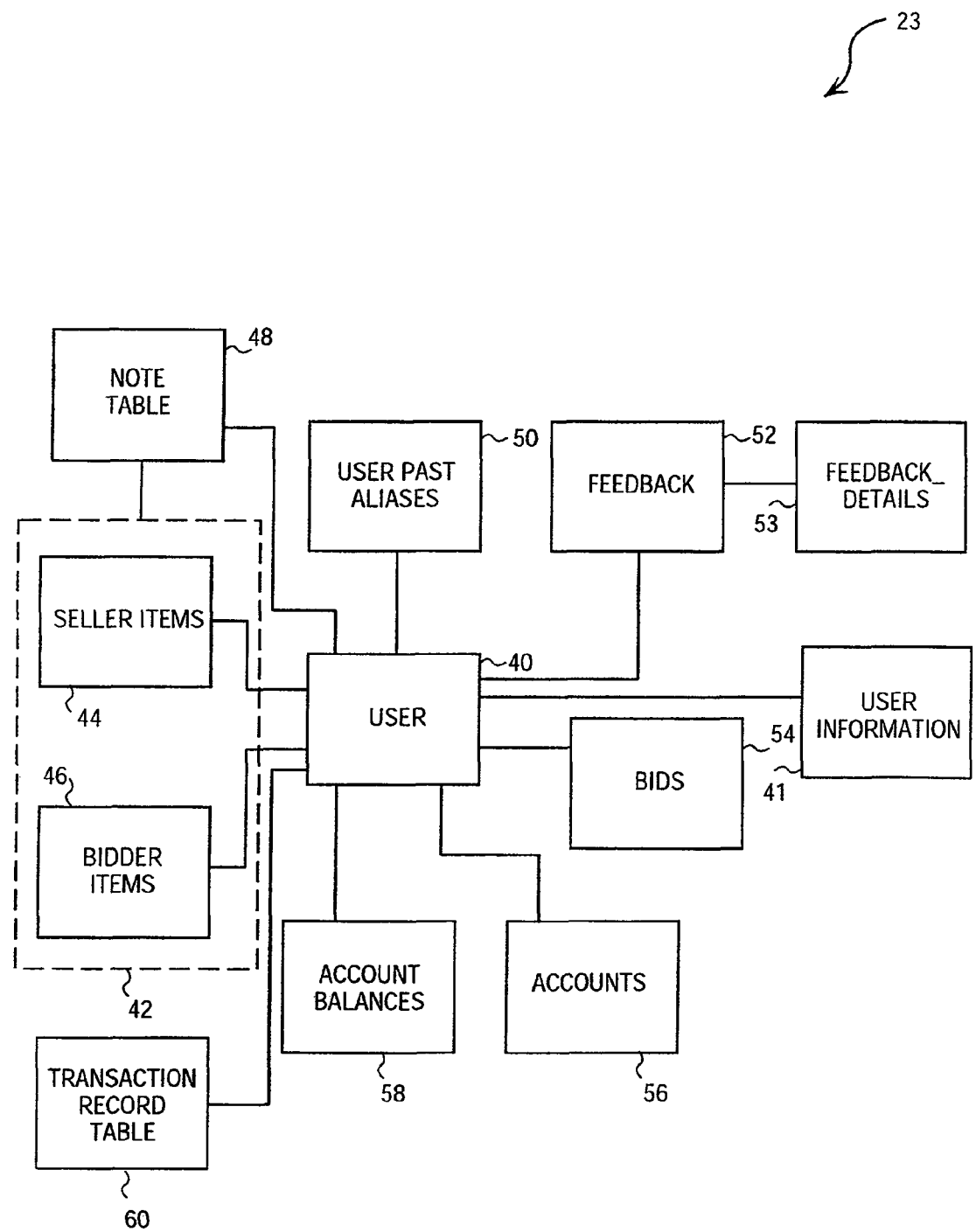
FIG. 2 is a block diagram of one embodiment of a database maintained by a database engine server.

FIG. 2 is a database diagram illustrating an exemplary database 23, maintain by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. A user information table 41 is linked to the user table 40 and includes more detailed information about each user. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

Figure 3:
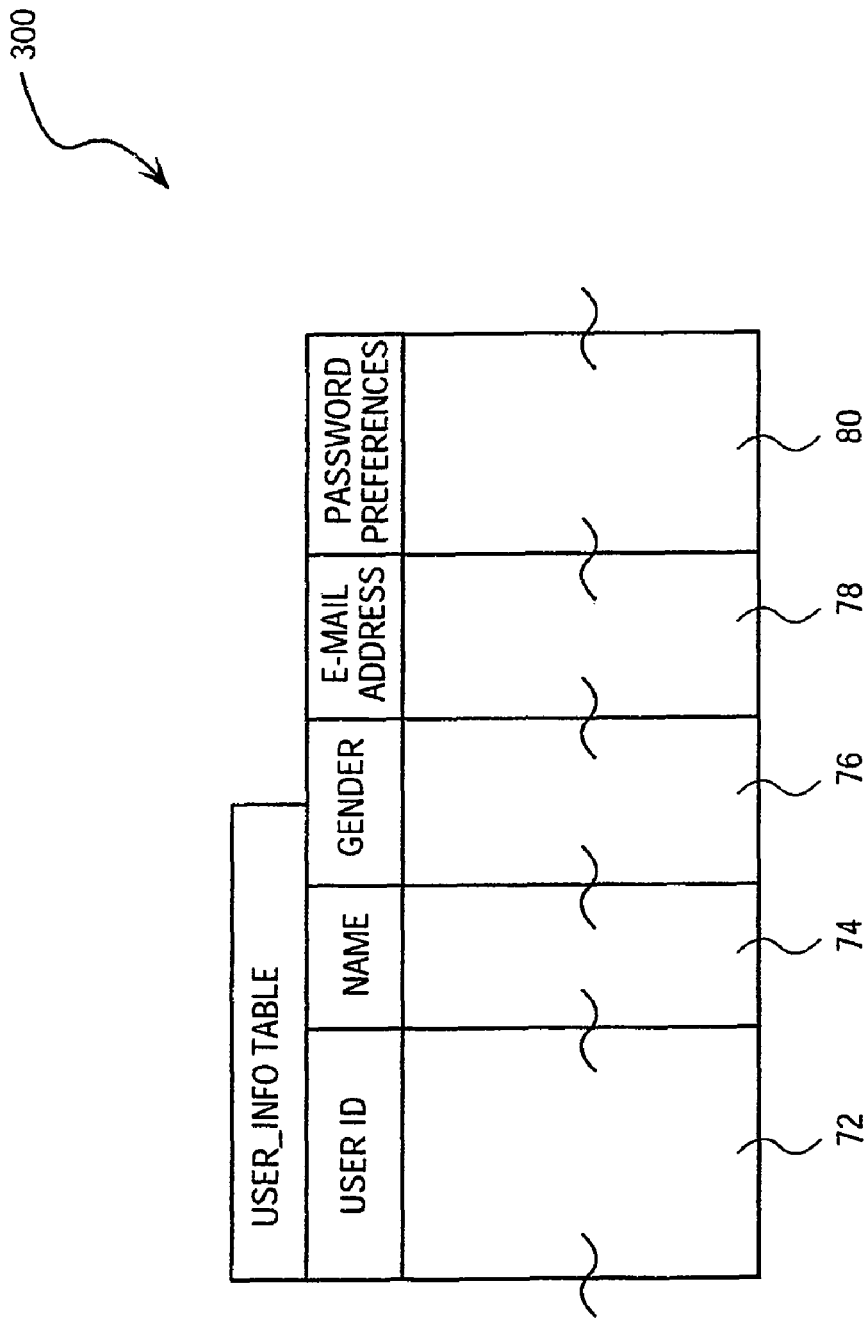
FIG. 3 is a diagrammatic representation of one embodiment of a user information table within the database.

FIG. 3 is a diagrammatic representation of an exemplary embodiment of the user information table 41. The user information table 41 stores detailed information about each user participating in the action facility 10. The table 41 includes a user identifier column 72 that stores, for each entry, a user identifier providing a pointer to the user table 40. A name column 74 stores the full name of each user. A gender column 76 stores the gender of each user. An e-mail address column 78 stores each user's e-mail address. A password preferences column 80 stores user login preference information that pertains to a plurality of features offered by a network-based transaction facility (e.g., auction facility 10).

It will be appreciated that other descriptive information may also populate the user information table 41.

Maintaining Login Preference Information

In order to facilitate the convenience and efficiency of users conducting business transactions within a network-based transaction facility such as auction facility 10, the present invention proposes a method and system whereby a user may provide his or her login preference information pertaining to any of a plurality of features offered by the network-based transaction facility. This login preference information is stored in a database (e.g., database 23) and utilized when a determination is made as to whether to require the user to enter his or her user identifier (user id) and password for accessing a feature within the network-based transaction facility.

Figure 4:
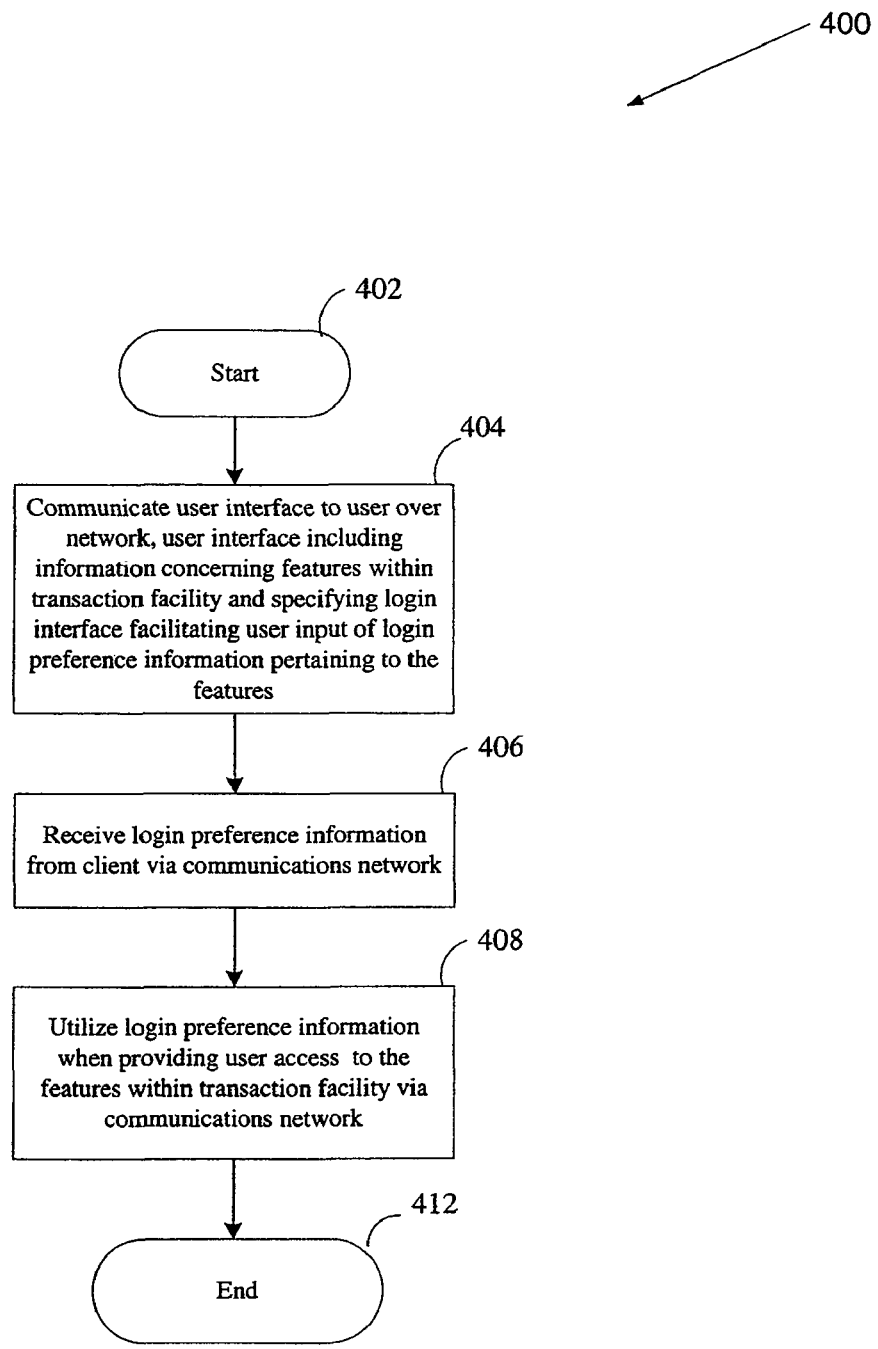
FIG. 4 is a flow chart of one embodiment of a method for maintaining login preference information of users of a network-based transaction facility.

FIG. 4 is a flow chart of one embodiment of method 400 for maintaining login preference information of users of a network-based transaction facility.

Method 400 begins with communicating user interface information to a client via a communications network (processing block 404). The user interface information includes information concerning a plurality of features within the network-based transaction facility. For instance, the plurality of features within network-based auction facility 10 may include such features as bidding, listing, feedback, chatting, etc. The user interface information also specifies a login interface that facilitates user input of login preference information pertaining to the features offered by the network-based transaction facility. In one embodiment, the login preference information indicates whether a user password should be remembered for each of these features. In one embodiment, these features do not include the features that involve display of user personal information. For instance, the user will be always required to enter a password for any feature that may display the credit card information or registration information of the user.

At processing block 406, the login preference information is received from the client via the communications network (e.g., via Internet). In one embodiment, the login preference information is stored in a database (e.g., in table 41 of database 23). Further, at processing block 410, the login preference information is utilized when providing user access to one of the features offered by the network-based transaction facility. One embodiment for utilizing the login preference information is described in greater detail below in conjunction with FIG. 5.

In one embodiment, the user is presented with an interface that allows the user to change the login preference information. In this embodiment, the database is updated each time the user changes the login preference information.

In one embodiment, when the user logs on into the transaction facility, a determination is made as to whether the user has previously provided the login preference information. If the determination is positive, a welcome user interface is presented to the user. The welcome user interface includes information indicating that the user has previously provided the login preference information and contains a link to a login preference interface, which allows the user to modify the existing login preference information.

Figure 5:
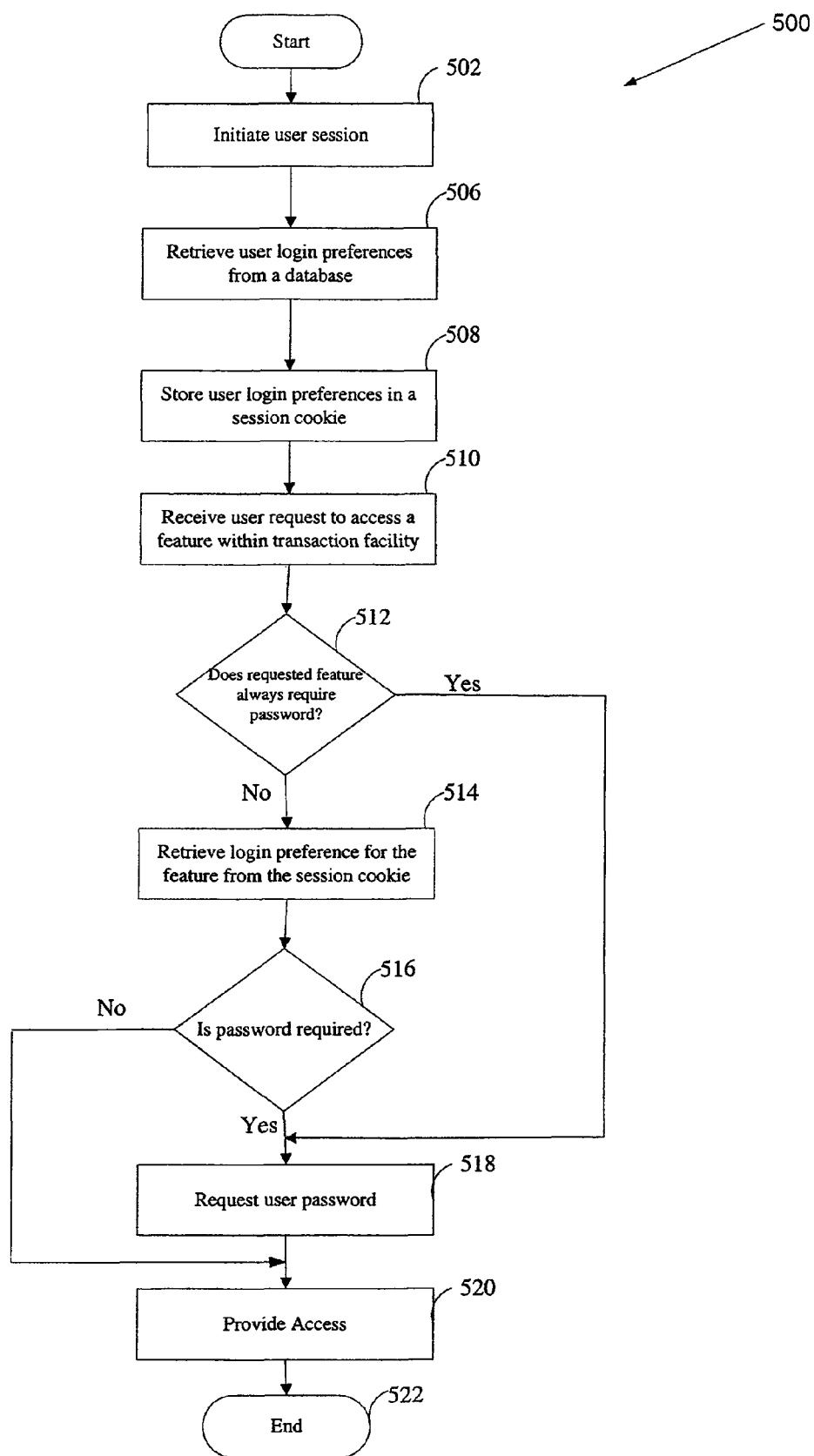
FIG. 5 is a flow chart of one embodiment of a method for utilizing user login preference information within a network-based transaction facility.

FIG. 5 is a flow chart of one embodiment of a method 500 for utilizing user login preference information within a network-based transaction facility.

Method 500 begins with initiating a user session (processing block 504). The user session is typically initiated when the user logs into the network-based transaction facility by providing his or her logon information (e.g., user id and password). Next, user login preference information is retrieved from a database (processing block 506) and stored in a session cookie (processing block 508). The session cookie may also store other information such as, for example, client's IP address, cookie ID, user ID, etc. In one embodiment, the information stored in the session cookie is encrypted. In one embodiment, the session cookie expires in a predefined time period (e.g., 20 minutes) if the user conducts no activity within the network-based transaction facility or if the user logs out (e.g., via the regular logout procedure or by closing the browser).

Subsequently, during the session, the user submits a request to access a particular feature within the network-based transaction facility (e.g., by activating a link or a button). Upon receiving the user request (processing block 510), a determination is made as to whether the requested feature always requires a password (decision box 512). In one embodiment, the password is always required for a feature involving display of user personal information such as, for example, the credit card information or registration information of the user. If the requested feature always requires a password, the user password is requested (processing block 514) and, upon receiving the correct password, access to the requested feature is provided (processing block 520).

Otherwise, if the requested feature is not designated as always requiring a password, login preference information pertaining to the requested feature is retrieved from the session cookie (processing block 514). Next, a determination is made as to whether the user has selected to require a password for this feature using the login preference information (processing block 516). If a password is required, the user is requested to enter a password (processing block 518), and if the entered password is correct, the access to the feature is provided (processing block 520). If the login preference information indicates that the password is not required, method 500 flows directly to processing block 520, which provides user access to the requested feature.

User Interfaces

Figure 6:
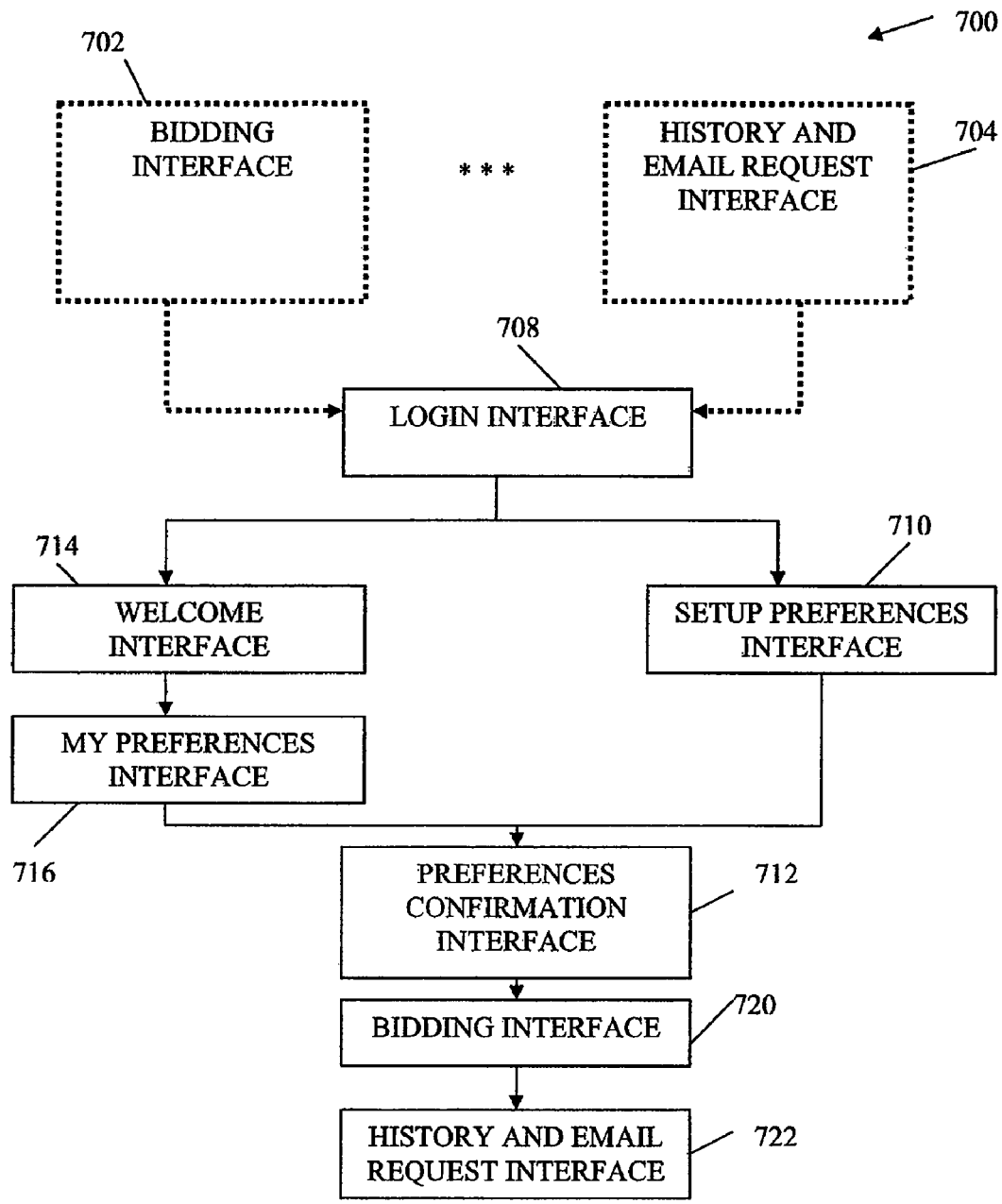
FIG. 6 is a block diagram of one embodiment of an interface sequence implemented to maintain and utilize login preference information of users of a network-based transaction facility.

FIG. 6 shows an interface sequence 700, according to an exemplary embodiment of the present invention, that may be implemented by auction facility 10 to maintain and utilize login preference information of users. Exemplary representations of the various interfaces included within sequence 700 are shown in FIGS. 7-15.

Interface sequence 700 commences with a login interface 708 through which a user of auction facility 10 provides at least a user identifier and associated password. Login interface 708 may be accessed via a number of interfaces communicating information pertaining to various features offered by auction facility 10 (e.g., bidding interface 702 or history and email request interface 704), each of which comprises a markup language document (e.g., HTML document) including a hypertext link to an object that generates login interface 708 as well as further interfaces of sequence 700. In one embodiment, login interface 708 also allows a user to request not to use a cookie during his or her online activity within auction facility 10.

If the user logs on into auction facility 10 via login interface 708 for the first time, the user is presented with setup preferences interface 710 which specifies various features offered by auction facility 10 and facilitates user input of login preference information pertaining to each of these features. That is, the user may indicate via setup preferences interface 710 whether the user wants to have his or her password remembered for each feature. After the user preferences are set, preferences confirmation interface 712 is displayed to inform the user that the preference settings have been saved and that the user may modify them upon accessing my preferences interface 716.

If the user logs on into auction facility 10 via login interface 708 not for the first time (i.e., the user has previously provided user login preference information), welcome interface 714 is displayed that welcomes the user by name and includes a link to my preferences interface 716. My preferences interface 716 displays existing user login preferences, i.e., identifies the features of auction facility 10 for which the user wishes to have the user password remembered, and allows the user to modify the existing preferences. Preferences confirmation interface 712 confirms that the user settings have been saved.

Further, when the user wishes to access a feature within auction facility 10, the user may or may not be required to enter a password depending on the user login preferences. For instance, if the user selected to have his or her password remembered for a bidding feature, bidding interface 720 is provided without requiring the user to enter the password. If the user chose not to have the password remembered for the bidding feature, the user is requested to enter the password before accessing bidding interface 720. In addition, bidding interface 720 includes a link to my preferences interface 716 to allow the user to modify the login preferences.

If the user wishes to view history or email address of another user, the user may be required to enter the password via history and email request interface 722 or, alternatively, directly receive the requested information depending on the user setting for this feature.

It should be noted that interfaces of other features may be included within sequence 700 instead of, or in addition to, any of bidding interface 720 and history and email request interface 722 depending on what features the user wishes to access during his or her online activity within auction facility 10.

Figure 15:

FIGS. 7-15 are exemplary representations of various interfaces included in sequence 700. FIGS. 7 and 15 are exemplary representations of a bidding interface. Bidding interface 702 of FIG. 7 is displayed to a user who has not previously set his or her login preferences. Bidding interface 702 includes button 802 allowing the user to set the login preferences via login interface 708. Bidding interface 720 of FIG. 14 is displayed to a user who has already set the login preferences in a previous session. Bidding interface 720 provides link 1502 to my preferences interface 716 allowing the user to modify the existing login preferences.

FIGS. 8 and 15 are exemplary representations of a history and email request interface. History and email request interface 704 of FIG. 8 is displayed to a user who has not previously set his or her login preferences and includes button 902 allowing the user to set the login preferences via login interface 708. History and email request interface 722 of FIG. 15 is displayed to a user who has previously selected not to have a user password remembered for this feature and includes link 1606 to my preferences interface 712 allowing the user to modify the existing login preferences.

FIG. 9 is an exemplary representation of login interface 708. Login interface 708 provides user identifier field 1002 and password field 1004 into which the user may enter a user identifier and password. In addition, the user may request not to use a cookie during the user online activity within auction facility 10 using link 1006.

FIG. 10 is an exemplary representation of setup preferences interface 710 which specifies various features offered within auction facility 10, namely selling, chat, my page, bidding, feedback, and other features. Check boxes 1102, 1104, 1106, 1108, 1110 and 1112 allow the user to set his or her preference for each of these features. That is, if the user checks any of these check boxes, the user will not be required to provide a password before accessing a corresponding feature. Note 1114 indicates that the user may change his or her preferences at any time using my preferences interface 716.

Figure 11:
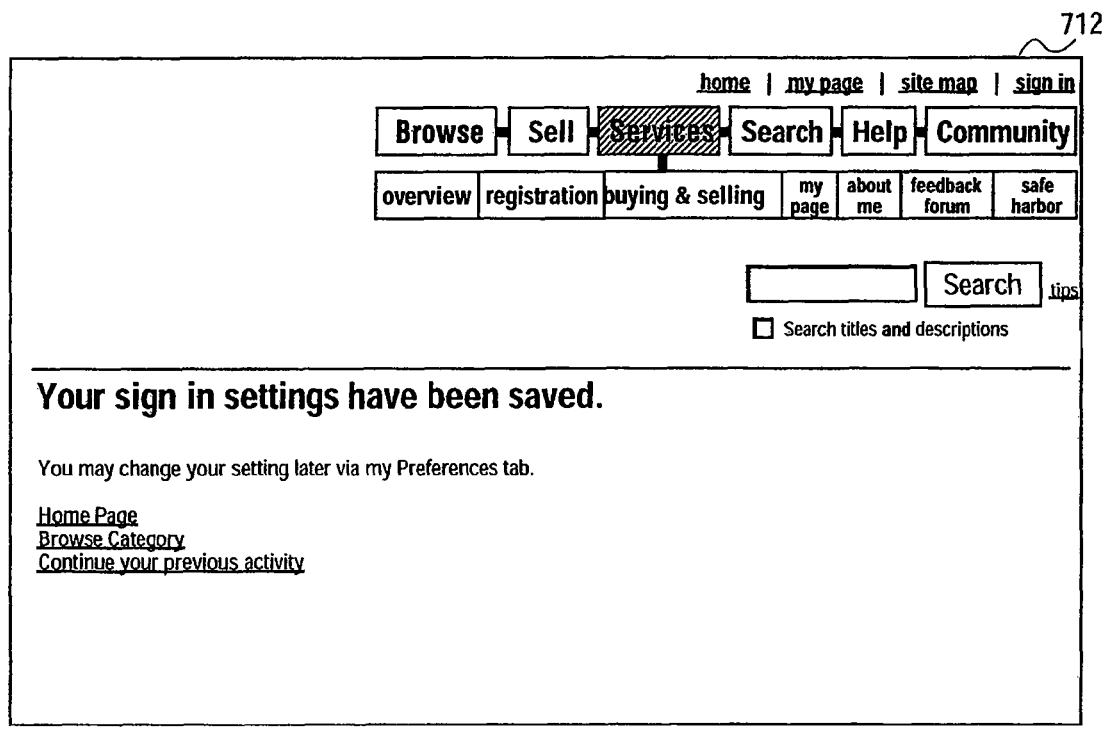

FIG. 11 is an exemplary representation of preferences confirmation interface 712 which notifies the user that the user login preference information has been saved.

Figure 12:
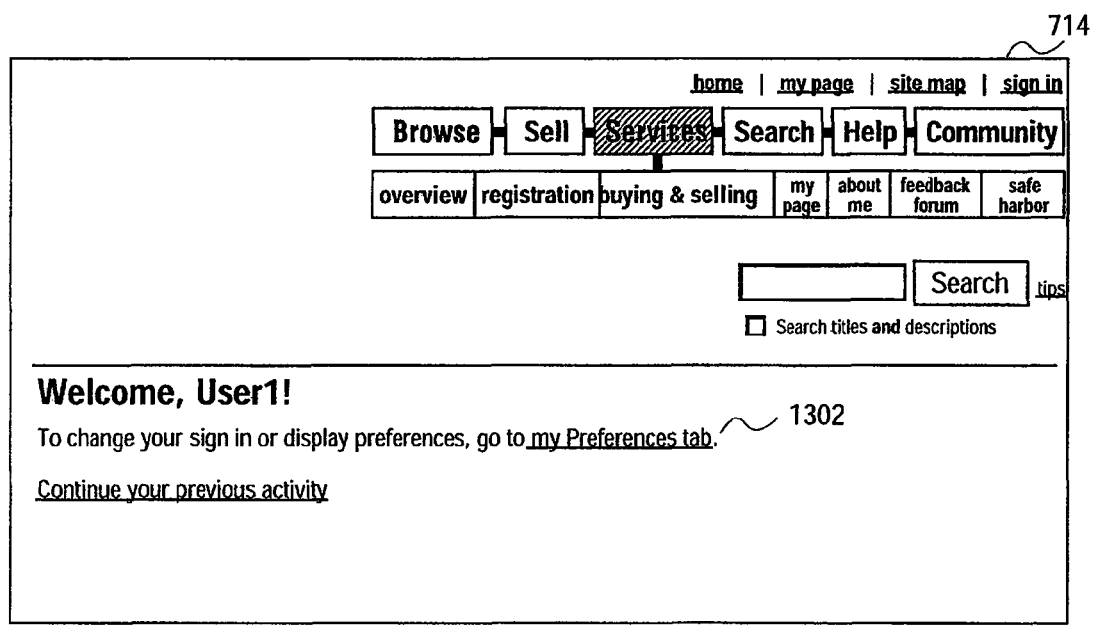

FIG. 12 is an exemplary representation of welcome interface 714 which is displayed if the user has already provided the login preference information in a previous session. Welcome interface 714 includes link 1302 to my preferences interface 716 which allows the user to change the existing login preferences.

Figure 13:
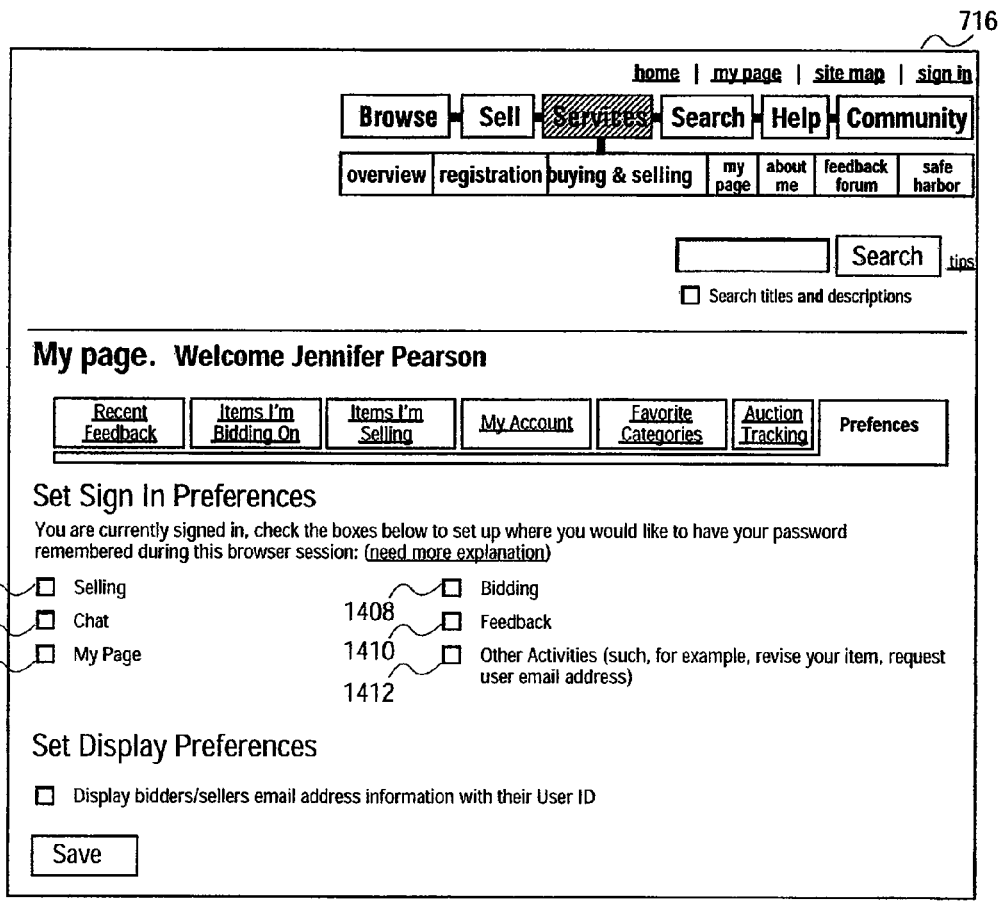

FIG. 13 is an exemplary representation of my preferences interface 716. My preferences interface 716 specifies user preferences for various features such as selling, chat, my page, bidding, feedback, and others. The user may change any of the existing preferences via check boxes 1102, 1104, 1106, 1108, 1110 and 1112.

In summary, it will be appreciated that the above described interfaces, and underlying technologies, provide a convenient vehicle for the inputting and modifying of user login preferences pertaining to various features offered by auction facility 10.

Computer Architecture

Figure 16:
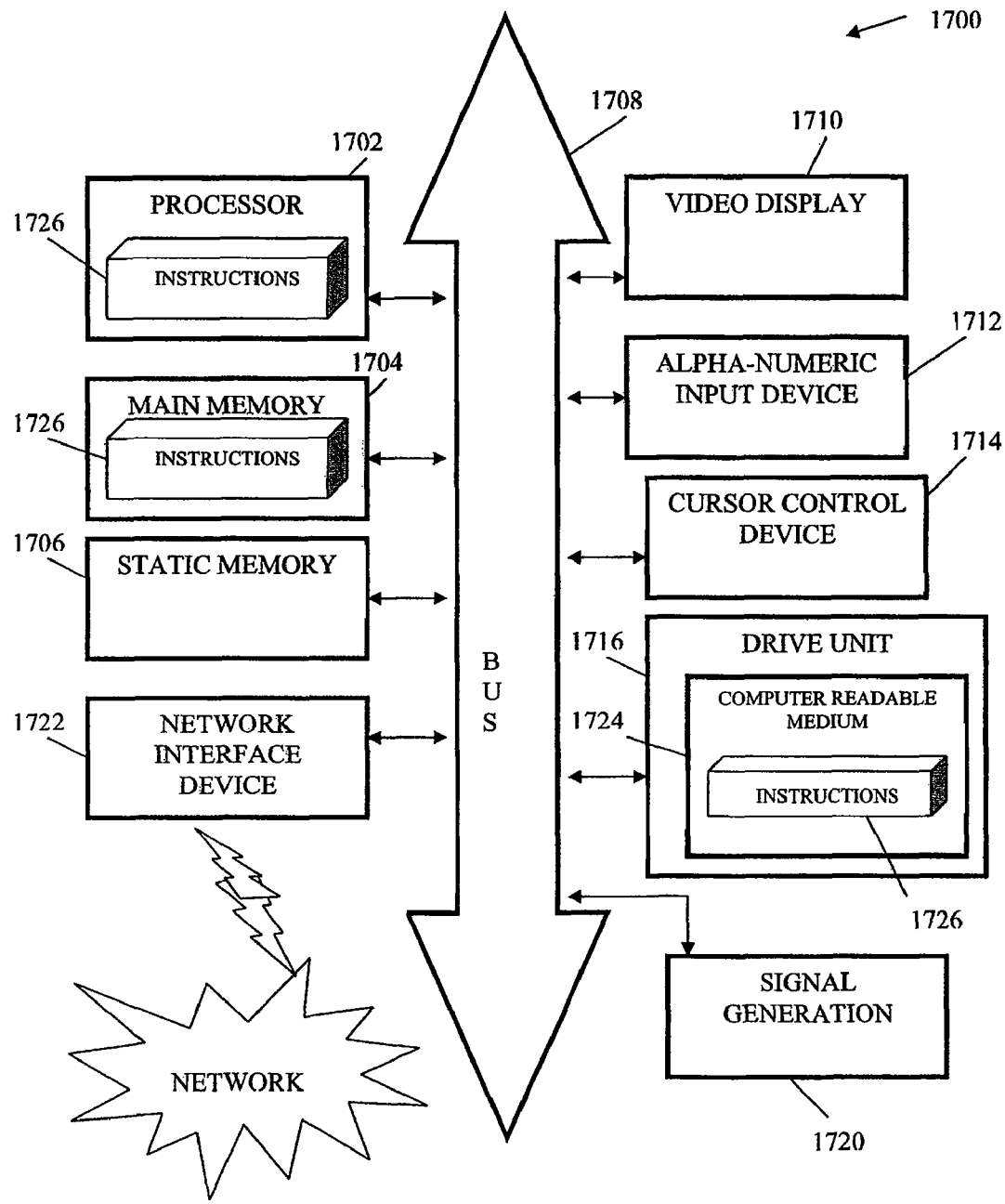
FIG. 16 is a block diagram of one embodiment of a computer system.

FIG. 16 shows a diagrammatic representation of machine in the exemplary form of a computer system 1700 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1700 includes a processor 1702, a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alpha-numeric input device 1712 (e.g. a keyboard), a cursor control device 1714 (e.g. a mouse), a disk drive unit 1716, a signal generation device 1720 (e.g., a speaker) and a network interface device 1722.

The disk drive unit 1716 includes a computer-readable medium 1724 on which is stored a set of instructions (i.e., software) 1726 embodying any one, or all, of the methodologies described above. The software 1726 is also shown to reside, completely or at least partially, within the main memory 1704 and/or within the processor 1702. The software 1726 may further be transmitted or received via the network interface device 1722. For the purposes of this specification, the term "computer-readable medium" shall be taken to include any medium that is capable of storing or encoding a sequence of instructions for execution by the machine and that cause the machine to perform any one of the methodologies of the present invention. The term "computer-readable medium" shall accordingly be taken to included, but not be limited to, solid-state memories, optical and magnetic disks, and carrier wave signals.

Thus, a method and system for maintaining login preference information of users of a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
   detecting, by a server, a successful login by a user to a network facility;
   accessing, by the server, user information to acquire login preference information for the user; and
   configuring, by the server, the network facility to selectively activate features for the network facility based on the login preference information and allowing the user decide on whether a cookie is to be saved during online activity with the network facility.

2. The method of claim 1 further comprising, monitoring, by the server, selections of the features and inspecting the login preference information with each selection to determine whether the user has to supply a password for access to that selection.

3. The method of claim 1 further comprising, determining, by the server, whether to retain the login preference information for a session between the user and the network facility based on the login preference information.

4. The method of claim 1 further comprising, presenting, by the server, a link to the user to modify the login preference information.

5. The method of claim 1 further comprising, removing, by the server, a session cookie that houses the login preference information when an event indicates that the user has logged out of or was forced out of a session with the network facility.

6. The method of claim 1 further comprising, overriding, by the server, contrary directions defined in the login preference information and requesting that the user enter a password when accessing a particular feature of the network facility that is to display personal information associated with the user.

7. The method of claim 1, wherein detecting further includes receiving notification of the successful login from the network facility along with an indication that the user is accessing the network facility via a phone.

8. The method of claim 1, wherein accessing further includes acquiring the login preference information from a database associated with the network facility and indexed within the database based on an identity for the user.

9. A method, comprising:
   presenting, by a server, an interface to a user for defining preference information for a network facility;
   receiving, by the server, selections within the interface for the preference information, a number of the selections defining particular features of the network facility and how the user is to interact with those particular features when the user subsequently authenticates to the network facility for access; and
   recording, by the server, the preference information and its association with the user for customized access to the network facility by the user with subsequent communication sessions between the user and the network facility and permitting the user to decide whether a cookie is to be saved during online activity with the network facility.

10. The method of claim 9, wherein presenting further includes authenticating the user for initial access to the network facility.

11. The method of claim 9, wherein receiving further includes recording a particular selection as an instruction to force the user to supply a user password each time the user accesses a particular feature of the network facility.

12. The method of claim 9, wherein receiving further includes recording a particular selection as an instruction to automatically remember and supply a user password on behalf of the user each time the user accesses a particular feature of the network facility where the user password is requested.

13. The method of claim 9, wherein receiving further includes recording a particular selection as an instruction to set the preference information within a client of the user for the subsequent communication sessions.

14. The method of claim 9, wherein receiving further includes recording a particular selection as an instruction to exclude the setting of the preference information within a client of the user for the subsequent communication sessions.

15. The method of claim 9, wherein receiving further includes recording a particular selection as an instruction to encrypt the preference information before recording or setting the preference information for use with the subsequent communication sessions.

16. The method of claim 9, wherein recording further includes indexing the preference information in a database associated with the network facility based on an identifier for the user.

17. A system, comprising:
   a server configured and programmed with a network facility that executes on the server and that interacts with users over a network; and
   the network facility configured to interact with each of the users to define preference information for each user that identifies how each user interacts with user-selected features of the network facility, the preference information enforced by the network facility each time a particular user logs into and interacts with the network facility, whether a cookie is to be saved during online activity with the network facility is determined and within the control of the user.

18. The system of claim 17, wherein the network facility is configured to interact with particular users accessing the network facility via phones.

19. The system of claim 17, wherein the network facility is configured to override some aspects of the preference information during interactions with the users.

20. The system of claim 17, wherein the network facility is configured to set the preference information within applications that process on client devices of the users for use by the network facility during interactions with the users.

* * * * *

UNITED STATES PATENT AND TRADEMARK OFFICE
CERTIFICATE OF CORRECTION

PATENT NO. : 8,291,233 B2
APPLICATION NO. : 12/880619
DATED : October 16, 2012
INVENTOR(S) : Pearson et al.

It is certified that error appears in the above-identified patent and that said Letters Patent is hereby corrected as shown below:

Title page 2, in column 2, under "Other Publications", line 48, delete "W," and insert --W.,--, therefor Title page 2, in column 2, under "Other Publications", line 49, delete "Bulletin,," and insert --Bulletin,--, therefor Title page 2, in column 2, under "Other Publications", line 53, delete "E," and insert --E.,--, therefor Title page 2, in column 2, under "Other Publications", line 56, delete "I," and insert --I.,--, therefor Title page 2, in column 2, under "Other Publications", line 58, delete "R," and insert --R.,--, therefor Title page 2, in column 2, under "Other Publications", line 61, delete "C M," and insert --C. M.,--, therefor Title page 3, in column 1, under "Other Publications", line 1, delete "G," and insert --G.,--, therefor Title page 3, in column 1, under "Other Publications", line 16, delete "Management.," and insert --Management,--, therefor Title page 3, in column 1, under "Other Publications", line 18, delete "B S," and insert --B. S.,--, therefor Title page 3, in column 1, under "Other Publications", line 19, after "Systems", delete ";" and insert --,--, therefor Title page 3, in column 1, under "Other Publications", line 21, delete "D L," and insert --D. L.,--, therefor Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 8,291,233 B2

Title page 3, in column 2, under "Other Publications", line 5, delete "T E," and insert --T. E.,--, therefor Title page 3, in column 2, under "Other Publications", line 8, delete "B F," and insert --B. F.,--, therefor Title page 3, in column 2, under "Other Publications", line 21, delete "A," and insert --A.,--, therefor In the drawings, Sheet 7 of 16, Fig. 7, line 27, delete "assu8mes" and insert --assumes--, therefor On sheet 14 of 16, figure 14, line 27, delete "assu8mes" and insert --assumes--, therefor In column 4, line 6, after "facility.", delete --¶--, therefor